UNITED STATES PATENT OFFICE.

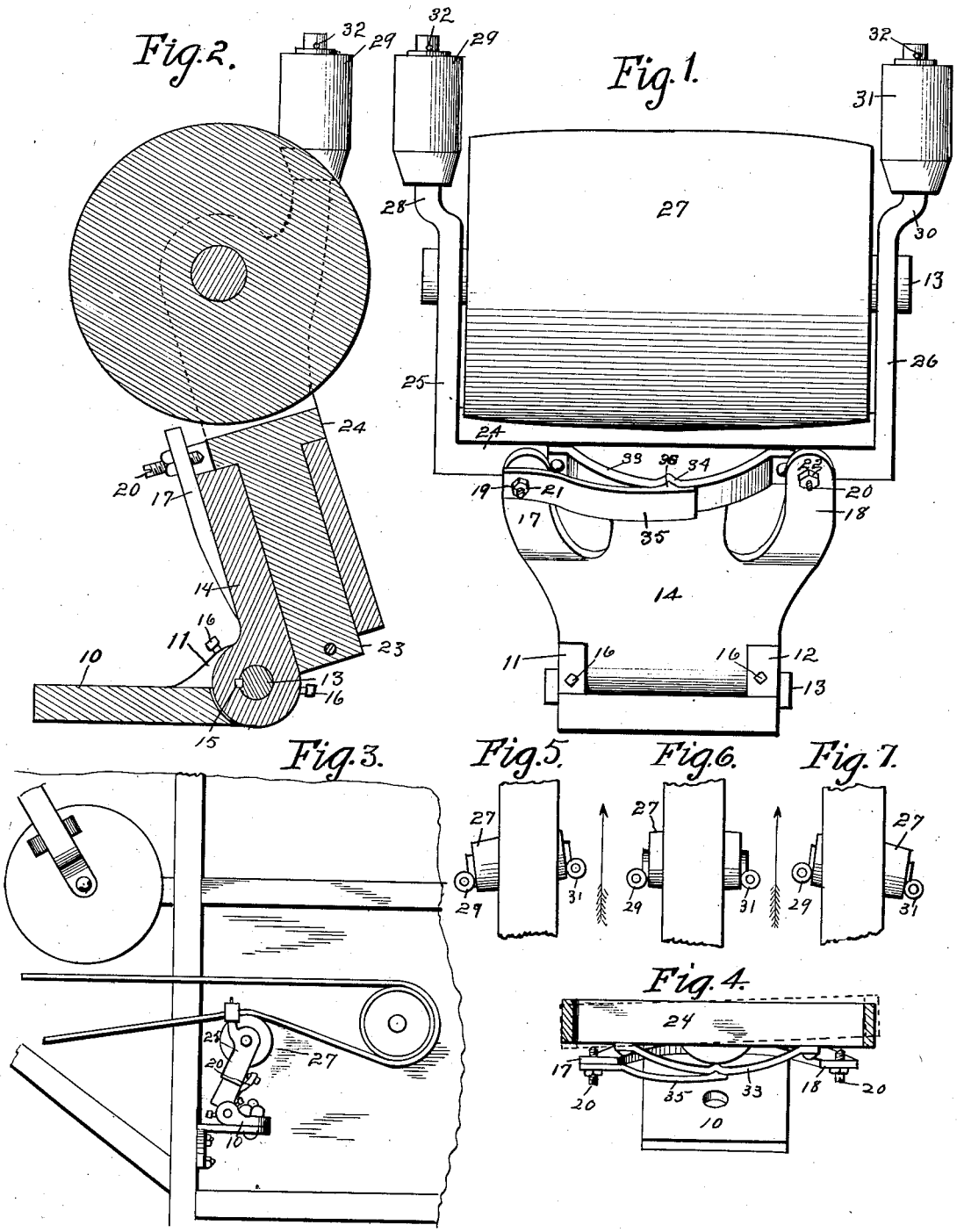

HOWARD F. SNYDER, OF NEWTON, IOWA, ASSIGNOR TO FRED L. MAYTAG, OF NEWTON, IOWA.

AUTOMATIC BELT-GUIDE.

No. 889,342.     Specification of Letters Patent.     Patented June 2, 1908.

Application filed March 14, 1904. Serial No. 197,935.

*To all whom it may concern:*

Be it known that I, HOWARD F. SNYDER, a citizen of the United States, residing at Newton, in the county of Jasper and State of Iowa, have invented a new and useful Belt-Guide, of which the following is a specification.

The objects of my invention are to provide a belt guide which will automatically maintain the belt in its operative position against side winds and will entirely obviate any friction on the edges of the belt in accomplishing this result.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 is a rear elevation of my belt guide. Fig. 2 is a vertical, sectional view of the same. Fig. 3 is a side elevation of the belt guide in position on a threshing machine, showing the belt on the belt guide in an operative position. Fig. 4 is a top view of the belt guide with the rollers removed, and shown in cross section the uprights for supporting the ends of the main roller. Fig. 5 is a plan view of the belt guide showing the belt at one side of the large roller. Fig. 6 is a plan view of the belt guide with the belt in the middle of the large roller and in the normal operative position, and Fig. 7 is a plan view of the belt guide and shows the belt at the opposite side of the large roller from that shown in Fig. 5.

Referring to the accompanying drawings, I have used the reference numeral 10 to indicate the base of my belt guide, said base having the lugs 11 and 12 at its forward end with a circular opening extending through their central portions. Extending transversely of the forward end of this base 10 and entering the openings in the lugs 11 and 12 is a shaft 13. Mounted on the shaft 13 and between the lugs 12 is the support 14, said support being held in position relative to the shaft 13 by means of a key 15. The shaft 13 and the support 14 which is mounted thereon is designed to be maintained in position relative to the base 10 by means of a number of set screws 16 which enter the lugs 11 and 12 and are designed to be forced into engagement with the shaft 13. These set screws are provided so that the support 14 may be placed at any desired angle relative to the base 10 by adjusting the set screws 16.

Extending upwardly and outwardly from the sides of the support 14 are the arms 17 and 18, the arms 17 having the screw threaded bolt 19 extending through it and designed to project forwardly from it a slight distance. The arm 18 also has a screw threaded bolt 20 extending through it and designed to project a slight distance forwardly from it, for limiting the swinging movement of the roller frame. The bolt 19 has a locking nut 21 and the bolt 20 has a locking nut 22, said nuts 21 and 22 being designed to hold the bolts in position relative to the arms 17 and 18.

Extending from the top to the bottom of the forward portion of the support 14 is a circular opening designed to admit the shank 23 having the cross head 24 at its upper end which is designed to rest upon the upper portion of the support 14, and to prevent the downward movement of the shank 23. Extending upwardly from and substantially at right angles to the ends of the cross head 24 are the uprights 25 and 26. The shanks 23, cross head 24 and the uprights 25 and 26 compose what is termed for convenience the roller support. Rotatably mounted in the uprights 25 and between them is the guide roller 27. The upright 25 has the roller bearing member 28 at its upper end, said member having mounted on it a safety roller 29. The upright 26 also has a roller bearing member 30 with the roller 31 mounted upon it. These rollers 29 and 31 are maintained on the roller bearing members 28 and 30 by the pins 32. In the construction of the device, the cross head 24 is immediately in front of the screw threaded bolts 19 and 20 so that this cross head when standing in its normal position will be equi-distant from the screw threaded bolts 19 and 20 as shown clearly in Fig. 4 of the drawings.

Attached to the rear edge of the cross head 24 is the curved bar 33 which has the notch 34 in its central rear portion. Attached to the arm 17 by means of the screw threaded bolt 19 and the nut 21 is the leaf spring 35 having the projection 36 near its free end. This projection 36 is designed to enter the notch 34 and to be maintained therein by the leaf spring 35 and it is designed to maintain the guide roller 27 against tilting movement; that is, in the normal position shown in Fig. 6 of the drawings where the belt is running over the center of the pulley and yet will not prevent the guide roller from being tilted easily to either of the angles shown in Fig. 5 or Fig. 7 when the belt approaches either edge of the roller. It will be easily seen that the base 10 can be easily attached to the ordinary threshing machine and the belt guide will be in readiness for use.

In practical operation and assuming that the parts of the device are assembled as above described, and that the belt guide is attached to the ordinary threshing machine and the belt is on the belt guide as shown in Fig. 3 of the drawings and that the belt is in the central portion of the roller as shown in Fig. 6 of the drawings. Then assuming that the belt is in operation and the portion which is traveling over the belt guide is moved in the direction indicated by the arrow in Fig. 3 and a side wind or other force causes the belt to be shifted to the right side of the roller as shown in Fig. 5. This will cause the roller to be tilted so that the right side of the roller will be drawn downwardly as well as forwardly and the left side will at the same time be forced upwardly and rearwardly. The reverse of this statement is also true when the belt shifts to the opposite side of the roller and the cross head 24 will be thrown into engagement with the screw threaded bolt 19, and as soon as the roller is in this position, the belt will be automatically forced to the center of the guide roller 27 and the roller will be moved back to its normal position when the belt is moving, as shown in Fig. 6. If the belt by any cause is shifted to the left side of the guide roller 27 as shown in Fig. 7 of the drawings, the roller will be tilted in the position shown therein and will cause the belt to be shifted to the center of the guide roller 27. The ease with which the guide roller is tilted from one position to another is due to the fact that the shaft which supports the roller is placed at an acute angle relative to the base which supports it, and the tendency of the belt in operation is to force the end of the roller over which it is running downwardly and rearwardly until the cross head 24 engages one of the screw threaded bolts 19 or 20, and as soon as the guide roller is in either of its tilted positions, the tendency of the belt is to move immediately to the center of the guide roller. Thus the belt will be constantly kept approximately in the center of the guide roller and this will be done without any wear upon the edges of the belt, or without any engagement of any portions of the device as it is in operation inasmuch as the safety rollers 29 and 31 are simply to prevent the belt from entirely slipping off of the guide roller in case of accident or in case the belt should become very loose in operation. The angle of the support 14 relative to the base 10 can be changed by adjusting the set screws 16 at the pleasure of the operator. In order that the belt operates the belt guide successfully, the support in which the guide roller is mounted should be inclined relative to the plate through which the belt in engagement with the belt guide passes.

Having thus described my invention, what I claim and desire to secure by Letters Patent of the United States, therefore is—

1. An automatic belt guide, comprising a base, a pivotally mounted roller support inclined relative to the base, a guide roller in said support designed to be swung on its pivot by the operation of the belt which passes over it, means for limiting the swinging movement of the guide roller, springing means designed to normally hold the guide roller midway between its extreme limits of movement, and safety rollers mounted on the upper portions of said roller support and at the ends of the guide roller, for the purposes stated.

2. In an automatic belt guide, a base, a support capable of being adjusted at any angle relative to said base, a roller support pivotally mounted in said support, a roller mounted in the roller support, means attached to the support, and springing means attached to the support for normally holding the roller support mid-way between its extreme limits of movement.

3. In an automatic belt guide, a base, a support adjustably mounted in an inclined position relative to said base, a roller support pivotally mounted in said support, a roller mounted in the roller support, adjustable means attached to the support, and springing means attached to the support for normally holding the roller support mid-way between its extreme limits of movement.

4. In an automatic belt guide, a base, a support adjustably mounted in an inclined position relative to said base, a roller support pivotally mounted in said support, a roller mounted in the roller support, means attached to the support for limiting the pivotal movement of the roller support, springing means attached to the support for normally holding the roller support mid-way between its extreme limits of movement, and a safety roller mounted at each end of the guide roller.

5. In an automatic belt guide, a base, a support adjustably mounted in an inclined position relative to said base, a roller support pivotally mounted in said support, a roller mounted in the roller support, adjustable means attached to the support for limiting the pivotal movement of the roller support, springing means attached to the support for normally holding the roller support mid-way between its extreme limits of movement, and a safety roller mounted at each end of the guide roller.

6. In an automatic belt guide, a guide roller over which a belt is designed to travel, a support for the guide roller, standing at an angle to the vertical, so that, in one position of said support, the guide roller will run in a horizontal plane and as it is swung from
5. this position in either direction, the roller will stand at an angle to the horizontal, so that the belt passing over it will be constantly forced toward the central portion of guide roller, and adjustable means for limiting the swinging movement of the guide roller.

HOWARD F. SNYDER.

Witnesses:
 JOHN T. HUME,
 W. R. LANE.